US012611909B2

(12) United States Patent
Turner et al.

(10) Patent No.: US 12,611,909 B2
(45) Date of Patent: Apr. 28, 2026

(54) PRECONDITIONING SURFACES USING INTELLIGENT THERMAL EFFECTORS

(71) Applicant: GENTHERM INCORPORATED, Northville, MI (US)

(72) Inventors: Kenneth Turner, Novi, MI (US); Amey Pise, Farmington Hills, MI (US); Chad Pacilli, Windsor (CA)

(73) Assignee: Gentherm Incorporated, Novi, MI (US)

( * ) Notice: Subject to any disclaimer, the term of this patent is extended or adjusted under 35 U.S.C. 154(b) by 277 days.

(21) Appl. No.: 18/547,077

(22) PCT Filed: Mar. 16, 2022

(86) PCT No.: PCT/US2022/071182
§ 371 (c)(1),
(2) Date: Aug. 18, 2023

(87) PCT Pub. No.: WO2022/198217
PCT Pub. Date: Sep. 22, 2022

(65) Prior Publication Data
US 2024/0123791 A1 Apr. 18, 2024

Related U.S. Application Data

(60) Provisional application No. 63/162,973, filed on Mar. 18, 2021.

(51) Int. Cl.
B60H 1/00 (2006.01)
B60N 2/00 (2006.01)
B60N 2/56 (2006.01)

(52) U.S. Cl.
CPC ..... B60H 1/00285 (2013.01); B60H 1/00478 (2013.01); B60H 1/00742 (2013.01);
(Continued)

(58) Field of Classification Search
CPC ............ B60H 1/00285; B60H 1/00878; B60H 1/00828; B60H 1/00742; B60H 1/00478;
(Continued)

(56) References Cited

U.S. PATENT DOCUMENTS

| | | | |
|---|---|---|---|
| 1,839,156 A | 12/1931 | Lumpkin | |
| 2,235,620 A | 3/1941 | Nessell | |

(Continued)

FOREIGN PATENT DOCUMENTS

| | | |
|---|---|---|
| CA | 979490 | 12/1975 |
| CN | 2128076 | 3/1993 |

(Continued)

OTHER PUBLICATIONS

U.S. Appl. No. 14/821,514, filed Aug. 7, 2015, Lofy.
(Continued)

*Primary Examiner* — Jose V Chen
(74) *Attorney, Agent, or Firm* — Knobbe, Martens, Olson & Bear, LLP

(57) ABSTRACT

A thermal conditioning system for conditioning a seat surface of a vehicle or other surface. The system includes a thermoelectric Peltier device with a main side and a waste side. A flap adjusts a proportion of an airflow between a main side airflow path and a waste side airflow path based on whether the surface is occupied, the power provided the thermoelectric Peltier device, the flow rates along the airflow paths, the power provided to a blower, and/or other factors.

30 Claims, 4 Drawing Sheets

(52) U.S. Cl.
CPC ..... *B60H 1/00828* (2013.01); *B60H 1/00878* (2013.01); *B60N 2/002* (2013.01); *B60N 2/0034* (2023.08); *B60N 2/0035* (2023.08); *B60N 2/5657* (2013.01); *B60N 2/5692* (2013.01); *B60H 2001/003* (2013.01); *B60N 2210/40* (2023.08)

(58) Field of Classification Search
CPC ............ B60H 2001/003; B60N 2/0034; B60N 2/0035; B60N 2/002; B60N 2/5657; B60N 2/5692; B60N 2210/40
USPC ...................................................... 297/180.1
See application file for complete search history.

(56) References Cited

U.S. PATENT DOCUMENTS

| | | |
|---|---|---|
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | De Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,648,469 A | 3/1972 | Chapman |
| 3,703,141 A | 11/1972 | Pernoud |
| 3,767,470 A | 10/1973 | Hines |
| 3,786,230 A | 1/1974 | Brandenburg, Jr. |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,100,963 A | 7/1978 | Dillenbeck |
| 4,124,794 A | 11/1978 | Eder |
| 4,152,094 A | 5/1979 | Honda et al. |
| 4,195,687 A | 4/1980 | Taziker |
| 4,223,205 A | 9/1980 | Sturgis |
| 4,224,565 A | 9/1980 | Sosniak et al. |
| 4,281,516 A | 8/1981 | Berthet et al. |
| 4,301,658 A | 11/1981 | Reed |
| 4,314,008 A | 2/1982 | Blake |
| 4,315,599 A | 2/1982 | Biancardi |
| 4,336,444 A | 6/1982 | Bice et al. |
| 4,338,944 A | 7/1982 | Arkans |
| 4,373,861 A | 2/1983 | Papst et al. |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,611,089 A | 9/1986 | Elsner et al. |
| 4,639,883 A | 1/1987 | Michaelis |
| 4,665,707 A | 5/1987 | Hamilton |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,806,081 A | 2/1989 | Harmsen et al. |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,853,992 A | 8/1989 | Yu |
| 4,923,248 A | 5/1990 | Feher |
| 4,947,648 A | 8/1990 | Harwell et al. |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,028,216 A | 7/1991 | Harmsen et al. |
| 5,057,490 A | 10/1991 | Skertic |
| 5,070,937 A | 12/1991 | Mougin et al. |
| 5,077,709 A | 12/1991 | Feher |
| 5,088,790 A | 2/1992 | Wainwright et al. |
| 5,097,674 A | 3/1992 | Imaiida et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |

(56) References Cited

U.S. PATENT DOCUMENTS

| | | | |
|---|---|---|---|
| 5,119,640 A | 6/1992 | Conrad | |
| 5,125,238 A | 6/1992 | Ragan et al. | |
| 5,148,977 A | 9/1992 | Hibino et al. | |
| 5,166,777 A | 11/1992 | Kataoka | |
| 5,187,349 A | 2/1993 | Curhan et al. | |
| 5,188,286 A | 2/1993 | Pence, IV | |
| 5,255,735 A | 10/1993 | Raghava et al. | |
| 5,256,857 A | 10/1993 | Curhan et al. | |
| 5,265,599 A | 11/1993 | Stephenson et al. | |
| 5,278,936 A | 1/1994 | Shao | |
| 5,279,128 A | 1/1994 | Tomatsu et al. | |
| 5,335,381 A | 8/1994 | Chang | |
| 5,367,728 A | 11/1994 | Chang | |
| 5,372,402 A | 12/1994 | Kuo | |
| 5,375,421 A | 12/1994 | Hsieh | |
| 5,382,075 A | 1/1995 | Shih | |
| 5,385,382 A | 1/1995 | Single, II et al. | |
| 5,409,547 A | 4/1995 | Watanabe et al. | |
| 5,413,166 A | 5/1995 | Kerner et al. | |
| 5,416,935 A | 5/1995 | Nieh | |
| 5,419,489 A | 5/1995 | Burd | |
| 5,419,780 A | 5/1995 | Suski | |
| 5,430,322 A | 7/1995 | Koyanagi et al. | |
| 5,436,519 A | 7/1995 | Takahashi et al. | |
| 5,448,788 A | 9/1995 | Wu | |
| 5,448,891 A | 9/1995 | Nakagiri et al. | |
| 5,449,275 A | 9/1995 | Gluszek et al. | |
| 5,456,081 A | 10/1995 | Chrysler et al. | |
| 5,473,783 A | 12/1995 | Allen | |
| 5,493,742 A | 2/1996 | Klearman | |
| 5,493,864 A | 2/1996 | Pomerene et al. | |
| 5,497,632 A | 3/1996 | Robinson | |
| 5,505,520 A | 4/1996 | Frusti et al. | |
| 5,515,238 A | 5/1996 | Fritz et al. | |
| 5,524,439 A | 6/1996 | Gallup et al. | |
| 5,542,503 A | 8/1996 | Dunn et al. | |
| 5,544,487 A | 8/1996 | Attey et al. | |
| 5,544,488 A | 8/1996 | Reid | |
| 5,555,732 A | 9/1996 | Whiticar | |
| 5,561,981 A | 10/1996 | Quisenberry et al. | |
| 5,576,512 A | 11/1996 | Doke | |
| 5,584,084 A | 12/1996 | Klearman et al. | |
| 5,584,183 A | 12/1996 | Wright et al. | |
| 5,594,609 A | 1/1997 | Lin | |
| 5,597,200 A | 1/1997 | Gregory et al. | |
| 5,601,399 A | 2/1997 | Okpara et al. | |
| 5,606,639 A | 2/1997 | Lehoe et al. | |
| 5,613,729 A | 3/1997 | Summer, Jr. | |
| 5,613,730 A | 3/1997 | Buie et al. | |
| 5,623,828 A | 4/1997 | Harrington | |
| 5,626,021 A | 5/1997 | Karunasiri et al. | |
| 5,626,386 A | 5/1997 | Lush | |
| 5,634,342 A | 6/1997 | Peeters et al. | |
| 5,637,921 A | 6/1997 | Burward-Hoy | |
| 5,640,728 A | 6/1997 | Graebe | |
| 5,642,539 A | 7/1997 | Kuo | |
| 5,645,314 A | 7/1997 | Liou | |
| 5,650,904 A | 7/1997 | Gilley et al. | |
| 5,653,741 A | 8/1997 | Grant | |
| 5,660,310 A | 8/1997 | LeGrow | |
| 5,667,622 A | 9/1997 | Hasegawa et al. | |
| 5,675,852 A | 10/1997 | Watkins | |
| 5,690,849 A | 11/1997 | DeVilbiss et al. | |
| 5,692,952 A | 12/1997 | Chih-Hung | |
| 5,704,213 A | 1/1998 | Smith et al. | |
| 5,715,695 A | 2/1998 | Lord | |
| 5,721,804 A | 2/1998 | Greene, III | |
| 5,724,818 A | 3/1998 | Iwata et al. | |
| 5,729,981 A | 3/1998 | Markus et al. | |
| 5,734,122 A | 3/1998 | Aspden | |
| 5,761,908 A | 6/1998 | Oas et al. | |
| 5,761,909 A | 6/1998 | Hughes et al. | |
| 5,772,500 A | 6/1998 | Harvey et al. | |
| 5,798,583 A | 8/1998 | Morita | |
| 5,800,490 A | 9/1998 | Patz et al. | |
| 5,802,855 A | 9/1998 | Yamaguchi et al. | |
| 5,802,856 A | 9/1998 | Schaper et al. | |
| 5,822,993 A | 10/1998 | Attey | |
| 5,827,424 A | 10/1998 | Gillis et al. | |
| 5,833,321 A | 11/1998 | Kim et al. | |
| 5,850,741 A | 12/1998 | Feher | |
| 5,865,031 A | 2/1999 | Itakura | |
| 5,871,151 A | 2/1999 | Fiedrich | |
| 5,884,485 A | 3/1999 | Yamaguchi et al. | |
| 5,884,486 A | 3/1999 | Hughes et al. | |
| 5,887,304 A | 3/1999 | Von der Heyde | |
| 5,888,261 A | 3/1999 | Fortune | |
| 5,895,964 A | 4/1999 | Nakayama | |
| 5,902,014 A | 5/1999 | Dinkel et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,289 A | 7/1999 | Bishop, II | |
| 5,924,766 A | 7/1999 | Esaki et al. | |
| 5,924,767 A | 7/1999 | Pietryga | |
| 5,927,817 A | 7/1999 | Ekman et al. | |
| 5,934,748 A | 8/1999 | Faust et al. | |
| 5,936,192 A | 8/1999 | Tauchi | |
| 5,937,908 A | 8/1999 | Inoshiri et al. | |
| 5,948,303 A | 9/1999 | Larson | |
| 5,950,067 A | 9/1999 | Maegawa et al. | |
| 5,952,728 A | 9/1999 | Imanishi et al. | |
| 5,987,893 A | 11/1999 | Schultz-Harder et al. | |
| 5,988,568 A | 11/1999 | Drews | |
| 5,992,154 A | 11/1999 | Kawada et al. | |
| 5,994,637 A | 11/1999 | Imanushi et al. | |
| 5,995,711 A | 11/1999 | Fukuoka et al. | |
| 6,000,225 A | 12/1999 | Ghoshal | |
| 6,003,950 A | 12/1999 | Larsson | |
| 6,006,524 A | 12/1999 | Park | |
| 6,019,420 A | 2/2000 | Faust et al. | |
| 6,038,865 A | 3/2000 | Watanabe et al. | |
| 6,048,024 A | 4/2000 | Wallman | |
| 6,049,655 A | 4/2000 | Vazirani | |
| 6,052,853 A | 4/2000 | Schmid | |
| 6,053,163 A | 4/2000 | Bass | |
| 6,059,018 A | 5/2000 | Yoshinori et al. | |
| 6,062,641 A | 5/2000 | Suzuki et al. | |
| 6,072,924 A | 6/2000 | Sato et al. | |
| 6,072,938 A | 6/2000 | Peterson et al. | |
| 6,073,998 A | 6/2000 | Siarkowski et al. | |
| 6,079,485 A * | 6/2000 | Esaki | B60H 1/00735 |
| | | | 219/202 |
| 6,084,172 A | 7/2000 | Kishi et al. | |
| 6,085,369 A | 7/2000 | Feher | |
| 6,086,831 A | 7/2000 | Harness et al. | |
| 6,087,638 A | 7/2000 | Silverbrook | |
| 6,094,919 A | 8/2000 | Bhatia | |
| 6,097,088 A | 8/2000 | Sakuragi | |
| 6,100,463 A | 8/2000 | Ladd et al. | |
| 6,101,815 A | 8/2000 | Van Oort et al. | |
| 6,103,967 A | 8/2000 | Cauchy et al. | |
| 6,105,373 A | 8/2000 | Watanabe et al. | |
| 6,109,688 A | 8/2000 | Wurz et al. | |
| 6,112,525 A | 9/2000 | Yoshida et al. | |
| 6,112,531 A | 9/2000 | Yamaguchi | |
| 6,116,029 A | 9/2000 | Krawec | |
| 6,119,463 A | 9/2000 | Bell | |
| 6,120,370 A | 9/2000 | Asou et al. | |
| 6,127,619 A | 10/2000 | Xi et al. | |
| 6,141,969 A | 11/2000 | Launchbury et al. | |
| 6,145,925 A | 11/2000 | Eksin et al. | |
| 6,158,224 A | 12/2000 | Hu et al. | |
| 6,161,241 A | 12/2000 | Zysman | |
| 6,161,388 A | 12/2000 | Ghoshal | |
| 6,164,076 A | 12/2000 | Chu et al. | |
| 6,164,719 A | 12/2000 | Rauh | |
| 6,166,905 A | 12/2000 | Oyamada et al. | |
| 6,171,333 B1 | 1/2001 | Nelson et al. | |
| 6,178,292 B1 | 1/2001 | Fukuoka et al. | |
| 6,179,706 B1 | 1/2001 | Yoshinori et al. | |
| 6,186,592 B1 | 2/2001 | Orizakis et al. | |
| 6,189,966 B1 | 2/2001 | Faust et al. | |
| 6,189,967 B1 | 2/2001 | Short | |

(56) References Cited

U.S. PATENT DOCUMENTS

| | | | |
|---|---|---|---|
| 6,196,627 B1 | 3/2001 | Faust et al. |
| 6,196,839 B1 | 3/2001 | Ross |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,959 B1 | 5/2001 | Kang et al. |
| 6,250,083 B1 | 6/2001 | Chou |
| 6,256,996 B1 | 7/2001 | Ghoshal |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,343,011 B1 | 1/2002 | Yu |
| 6,345,507 B1 | 2/2002 | Gillen |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,438,964 B1 | 8/2002 | Giblin |
| 6,444,893 B1 | 9/2002 | Onoue et al. |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| 6,552,464 B2 | 4/2003 | Rahbar et al. |
| 6,557,353 B1 | 5/2003 | Fusco et al. |
| RE38,128 E | 6/2003 | Gallup et al. |
| 6,571,564 B2 | 6/2003 | Upadhye et al. |
| 6,573,596 B2 | 6/2003 | Saika |
| 6,574,967 B1 | 6/2003 | Park et al. |
| 6,578,986 B2 | 6/2003 | Swaris et al. |
| 6,580,025 B2 | 6/2003 | Guy |
| 6,581,225 B1 | 6/2003 | Imai |
| 6,583,638 B2 | 6/2003 | Costello et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,653,607 B2 | 11/2003 | Ellis et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,829 B2 | 8/2004 | Lebrun |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,832,732 B2 | 12/2004 | Burkett et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,876,549 B2 | 4/2005 | Beitmal et al. |
| 6,886,351 B2 | 5/2005 | Palfy et al. |
| 6,892,807 B2 | 5/2005 | Fristedt et al. |
| 6,893,086 B2 | 5/2005 | Bajic et al. |
| 6,904,629 B2 | 6/2005 | Wu |
| 6,907,739 B2 | 6/2005 | Bell |
| 6,916,160 B2 | 7/2005 | Obara |
| 6,923,216 B2 | 8/2005 | Extrand et al. |
| 6,933,469 B2 | 8/2005 | Ellis et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B1 | 1/2006 | Litvak |
| 7,000,490 B1 | 2/2006 | Micheels |
| 7,036,163 B2 | 5/2006 | Schmid |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |

(56)                    References Cited

U.S. PATENT DOCUMENTS

| 7,070,232 B2 | 7/2006 | Minegishi et al. |
| 7,071,587 B2 | 7/2006 | Lopatinsky et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,100,978 B2 | 9/2006 | Ekern et al. |
| 7,108,319 B2 | 9/2006 | Hartwich et al. |
| 7,111,465 B2 | 9/2006 | Bell |
| 7,114,771 B2 | 10/2006 | Lofy et al. |
| 7,124,593 B2 | 10/2006 | Feher |
| 7,131,689 B2 | 11/2006 | Brennan et al. |
| 7,134,715 B1 | 11/2006 | Fristedt et al. |
| 7,141,763 B2 | 11/2006 | Moroz |
| 7,147,279 B2 | 12/2006 | Bevan et al. |
| 7,165,281 B2 | 1/2007 | Larssson et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,202,444 B2 | 4/2007 | Bulgajewski |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,231,772 B2 | 6/2007 | Bell |
| 7,244,887 B2 | 7/2007 | Miley |
| 7,246,496 B2 | 7/2007 | Goenka et al. |
| 7,272,936 B2 | 9/2007 | Feher |
| 7,273,981 B2 | 9/2007 | Bell |
| 7,299,639 B2 | 11/2007 | Leija et al. |
| 7,320,223 B1 | 1/2008 | Dabney et al. |
| 7,337,615 B2 | 3/2008 | Reidy |
| 7,338,117 B2 | 3/2008 | Iqbal et al. |
| 7,340,907 B2 | 3/2008 | Vogh et al. |
| 7,355,146 B2 | 4/2008 | Angelis et al. |
| 7,356,912 B2 | 4/2008 | Iqbal et al. |
| 7,360,365 B2 | 4/2008 | Codecasa et al. |
| 7,360,416 B2 | 4/2008 | Manaka et al. |
| 7,370,479 B2 | 5/2008 | Pfannenberg |
| 7,370,911 B2 | 5/2008 | Bajic et al. |
| 7,380,586 B2 | 6/2008 | Gawthrop |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 | 6/2010 | Asada et al. |
| RE41,765 E | 9/2010 | Gregory et al. |
| 7,827,620 B2 | 11/2010 | Feher |
| 7,827,805 B2 | 11/2010 | Comiskey et al. |
| 7,832,214 B2 | 11/2010 | Ito et al. |
| 7,862,113 B2 | 1/2011 | Knoll |
| 7,866,017 B2 | 1/2011 | Knoll |
| 7,877,827 B2 | 2/2011 | Marquette et al. |
| 7,937,789 B2 | 5/2011 | Feher |
| 7,963,594 B2 | 6/2011 | Wolas |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,397,518 B1 | 3/2013 | Vistakula |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,500,194 B2 * | 8/2013 | Fischer ............. B60R 21/01532 |
| | | 297/180.12 |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,640,466 B2 | 2/2014 | Bell et al. |
| 8,653,763 B2 | 2/2014 | Lin et al. |
| 8,678,492 B2 * | 3/2014 | Benton ................ B60N 2/5692 |
| | | 297/180.14 |
| 8,732,874 B2 | 5/2014 | Brykalski et al. |
| 8,777,320 B2 | 7/2014 | Stoll et al. |
| 8,782,830 B2 | 7/2014 | Brykalski et al. |
| 8,869,596 B2 | 10/2014 | Hagl |
| 8,893,329 B2 | 11/2014 | Petrovksi |
| 8,893,513 B2 | 11/2014 | June et al. |
| 9,027,360 B2 | 5/2015 | Chainer et al. |
| 9,105,808 B2 | 8/2015 | Petrovksi |
| 9,105,809 B2 | 8/2015 | Lofy |
| 9,121,414 B2 | 9/2015 | Lofy et al. |
| 9,125,497 B2 | 9/2015 | Brykalski et al. |
| 9,310,112 B2 | 4/2016 | Bell et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,603,459 B2 | 3/2017 | Brykalski et al. |
| 9,622,588 B2 | 4/2017 | Brykalski et al. |
| 9,651,279 B2 | 5/2017 | Lofy |
| 9,662,962 B2 | 5/2017 | Steinman et al. |
| 9,685,599 B2 | 6/2017 | Petrovski et al. |
| 9,719,701 B2 | 8/2017 | Bell et al. |
| 9,814,641 B2 | 11/2017 | Brykalski et al. |
| 9,857,107 B2 | 1/2018 | Inaba et al. |
| 9,958,190 B2 | 5/2018 | West |
| 9,989,267 B2 | 6/2018 | Brykalski et al. |
| 10,005,337 B2 | 6/2018 | Petrovski |
| 10,160,356 B2 | 12/2018 | Lofy et al. |
| 10,179,966 B2 | 1/2019 | Kim et al. |
| 10,208,990 B2 | 2/2019 | Petrovski et al. |
| 10,219,323 B2 | 2/2019 | Inaba et al. |
| 10,228,166 B2 | 3/2019 | Lofy |
| 10,266,031 B2 | 4/2019 | Steinman et al. |
| 10,288,084 B2 | 5/2019 | Lofy et al. |
| 10,290,796 B2 | 5/2019 | Boukai et al. |
| 10,295,201 B2 | 5/2019 | Wang et al. |
| 10,405,667 B2 | 9/2019 | Marquette et al. |
| 10,457,173 B2 | 10/2019 | Lofy et al. |
| 10,495,322 B2 | 12/2019 | Brykalski et al. |
| 10,558,229 B2 | 2/2020 | Kates |
| 10,647,230 B2 | 5/2020 | Fujii et al. |
| 10,647,232 B2 | 5/2020 | Lofy et al. |
| 10,773,617 B2 | 9/2020 | Zhang |
| 10,991,869 B2 | 4/2021 | Jovovic et al. |
| 11,033,058 B2 | 6/2021 | Cauchy |
| 11,075,331 B2 | 7/2021 | Bück |
| 11,148,505 B2 | 10/2021 | Neumeister et al. |
| 11,152,557 B2 | 10/2021 | Jovovic et al. |
| 11,223,004 B2 | 1/2022 | Jovovic |
| 11,408,438 B2 | 8/2022 | Lofy et al. |
| 11,639,816 B2 | 5/2023 | Cauchy |
| 11,659,939 B2 * | 5/2023 | Amman ................ A47C 31/008 |
| | | 297/180.1 |
| 11,761,647 B2 | 9/2023 | Baverstock et al. |
| 11,774,128 B2 | 10/2023 | Costa et al. |
| 11,780,353 B2 * | 10/2023 | Sato ........................ B60N 2/58 |
| | | 297/180.1 |

(56)  References Cited

U.S. PATENT DOCUMENTS

| | | | |
|---|---|---|---|
| 11,857,004 B2 | 1/2024 | Cauchy | |
| 11,993,132 B2 | 5/2024 | Pacilli et al. | |
| 12,025,151 B2 | 7/2024 | Lofy et al. | |
| 12,365,276 B2 | 7/2025 | Yoo et al. | |
| 12,459,335 B2 | 11/2025 | Pacilli et al. | |
| 2001/0005990 A1 | 7/2001 | Kim et al. | |
| 2001/0014212 A1 | 8/2001 | Rutherford | |
| 2001/0028185 A1 | 10/2001 | Stowe et al. | |
| 2002/0017102 A1 | 2/2002 | Bell | |
| 2002/0026226 A1 | 2/2002 | Ein | |
| 2002/0062854 A1 | 5/2002 | Sharp | |
| 2002/0092308 A1 | 7/2002 | Bell | |
| 2002/0100121 A1 | 8/2002 | Kocurek | |
| 2002/0108380 A1 | 8/2002 | Nelsen et al. | |
| 2002/0121094 A1 | 9/2002 | VanHoudt | |
| 2002/0171132 A1 | 11/2002 | Buchwalter et al. | |
| 2002/0195844 A1 | 12/2002 | Hipwell | |
| 2003/0039298 A1 | 2/2003 | Eriksson et al. | |
| 2003/0041892 A1 | 3/2003 | Fleurial et al. | |
| 2003/0070235 A1 | 4/2003 | Suzuki et al. | |
| 2003/0084511 A1 | 5/2003 | Salvatini et al. | |
| 2003/0110779 A1 | 6/2003 | Otey et al. | |
| 2003/0133492 A1 | 7/2003 | Watanabe | |
| 2003/0145380 A1 | 8/2003 | Schmid | |
| 2003/0150060 A1 | 8/2003 | Huang | |
| 2003/0160479 A1 | 8/2003 | Minuth et al. | |
| 2003/0188382 A1 | 10/2003 | Klamm et al. | |
| 2003/0234247 A1 | 12/2003 | Stern | |
| 2004/0090093 A1 | 5/2004 | Kamiya et al. | |
| 2004/0098991 A1 | 5/2004 | Heyes | |
| 2004/0113549 A1 | 6/2004 | Roberts et al. | |
| 2004/0139758 A1 | 7/2004 | Kamiya et al. | |
| 2004/0164594 A1 | 8/2004 | Stoewe et al. | |
| 2004/0177622 A1 | 9/2004 | Harvie | |
| 2004/0177876 A1 | 9/2004 | Hightower | |
| 2004/0177877 A1 | 9/2004 | Hightower | |
| 2004/0191060 A1 | 9/2004 | Chiu et al. | |
| 2004/0195870 A1 | 10/2004 | Bohlender | |
| 2004/0238022 A1 | 12/2004 | Hiller et al. | |
| 2004/0255364 A1 | 12/2004 | Feher | |
| 2004/0264009 A1 | 12/2004 | Hwang et al. | |
| 2005/0000558 A1 | 1/2005 | Moriyama et al. | |
| 2005/0011009 A1 | 1/2005 | Wu | |
| 2005/0012204 A1 | 1/2005 | Strnad | |
| 2005/0045702 A1 | 3/2005 | Freeman et al. | |
| 2005/0056310 A1 | 3/2005 | Shikata et al. | |
| 2005/0067862 A1 | 3/2005 | Iqbal et al. | |
| 2005/0072165 A1 | 4/2005 | Bell | |
| 2005/0076944 A1 | 4/2005 | Kanatzidis et al. | |
| 2005/0078451 A1 | 4/2005 | Sauciuc et al. | |
| 2005/0086739 A1 | 4/2005 | Wu | |
| 2005/0121065 A1 | 6/2005 | Otey | |
| 2005/0126184 A1 | 6/2005 | Cauchy | |
| 2005/0140180 A1 | 6/2005 | Hesch | |
| 2005/0143797 A1 | 6/2005 | Parish et al. | |
| 2005/0145285 A1 | 7/2005 | Extrand | |
| 2005/0161072 A1 | 7/2005 | Esser et al. | |
| 2005/0173950 A1 | 8/2005 | Bajic et al. | |
| 2005/0183763 A1 | 8/2005 | Christiansen | |
| 2005/0193742 A1 | 9/2005 | Arnold | |
| 2005/0200166 A1 | 9/2005 | Noh | |
| 2005/0202774 A1 | 9/2005 | Lipke | |
| 2005/0220167 A1 | 10/2005 | Kanai et al. | |
| 2005/0251120 A1 | 11/2005 | Anderson et al. | |
| 2005/0257532 A1 | 11/2005 | Ikeda et al. | |
| 2005/0259394 A1 | 11/2005 | Lin | |
| 2005/0268956 A1 | 12/2005 | Take | |
| 2005/0278863 A1 | 12/2005 | Bahash et al. | |
| 2005/0285438 A1 | 12/2005 | Ishima et al. | |
| 2005/0288749 A1 | 12/2005 | Lachenbruch | |
| 2006/0005548 A1 | 1/2006 | Ruckstuhl | |
| 2006/0005944 A1 | 1/2006 | Wang et al. | |
| 2006/0053529 A1 | 3/2006 | Feher | |
| 2006/0060344 A1 | 3/2006 | Esaki | |
| 2006/0075760 A1 | 4/2006 | Im et al. | |
| 2006/0078319 A1 | 4/2006 | Maran | |
| 2006/0080778 A1 | 4/2006 | Chambers | |
| 2006/0087160 A1 | 4/2006 | Dong et al. | |
| 2006/0102224 A1 | 5/2006 | Chen et al. | |
| 2006/0118158 A1 | 6/2006 | Zhang et al. | |
| 2006/0123799 A1 | 6/2006 | Tateyama et al. | |
| 2006/0137099 A1 | 6/2006 | Feher | |
| 2006/0157102 A1 | 7/2006 | Nakajima et al. | |
| 2006/0158011 A1 | 7/2006 | Marlovits et al. | |
| 2006/0162074 A1 | 7/2006 | Bader | |
| 2006/0162341 A1 | 7/2006 | Milazzo | |
| 2006/0175877 A1 | 8/2006 | Alionte et al. | |
| 2006/0197363 A1 | 9/2006 | Lofy et al. | |
| 2006/0200398 A1 | 9/2006 | Botton et al. | |
| 2006/0201161 A1 | 9/2006 | Hirai et al. | |
| 2006/0201162 A1 | 9/2006 | Hsieh | |
| 2006/0213682 A1 | 9/2006 | Moon et al. | |
| 2006/0214480 A1 | 9/2006 | Terech | |
| 2006/0219699 A1 | 10/2006 | Geisel et al. | |
| 2006/0225441 A1 | 10/2006 | Goenka et al. | |
| 2006/0225773 A1 | 10/2006 | Venkatasubramanian et al. | |
| 2006/0237166 A1 | 10/2006 | Otey et al. | |
| 2006/0243317 A1 | 11/2006 | Venkatasubramanian | |
| 2006/0244289 A1 | 11/2006 | Bedro | |
| 2006/0254284 A1* | 11/2006 | Ito | B60N 2/5635 |
| | | | 62/3.61 |
| 2006/0273646 A1 | 12/2006 | Comiskey et al. | |
| 2006/0289051 A1 | 12/2006 | Niimi et al. | |
| 2007/0017666 A1 | 1/2007 | Goenka et al. | |
| 2007/0035162 A1 | 2/2007 | Bier et al. | |
| 2007/0040421 A1 | 2/2007 | Zuzga et al. | |
| 2007/0069554 A1 | 3/2007 | Comiskey et al. | |
| 2007/0086757 A1 | 4/2007 | Feher | |
| 2007/0089773 A1 | 4/2007 | Koester et al. | |
| 2007/0095378 A1 | 5/2007 | Ito et al. | |
| 2007/0095383 A1 | 5/2007 | Tajima | |
| 2007/0101602 A1 | 5/2007 | Bae et al. | |
| 2007/0101729 A1 | 5/2007 | Aoki et al. | |
| 2007/0107450 A1 | 5/2007 | Sasao et al. | |
| 2007/0138844 A1 | 6/2007 | Kim | |
| 2007/0142883 A1 | 6/2007 | Quincy, III | |
| 2007/0145808 A1 | 6/2007 | Minuth et al. | |
| 2007/0157630 A1 | 7/2007 | Kadle et al. | |
| 2007/0157631 A1 | 7/2007 | Huang et al. | |
| 2007/0158981 A1 | 7/2007 | Almasi et al. | |
| 2007/0163269 A1 | 7/2007 | Chung et al. | |
| 2007/0190712 A1 | 8/2007 | Lin et al. | |
| 2007/0193279 A1 | 8/2007 | Yoneno et al. | |
| 2007/0194668 A1 | 8/2007 | Teshima et al. | |
| 2007/0200398 A1 | 8/2007 | Wolas et al. | |
| 2007/0214956 A1 | 9/2007 | Carlson et al. | |
| 2007/0220907 A1 | 9/2007 | Ehlers | |
| 2007/0227158 A1 | 10/2007 | Kuchimachi | |
| 2007/0234742 A1 | 10/2007 | Aoki et al. | |
| 2007/0241592 A1 | 10/2007 | Giffin et al. | |
| 2007/0251016 A1 | 11/2007 | Feher | |
| 2007/0256722 A1 | 11/2007 | Kondoh | |
| 2007/0261412 A1 | 11/2007 | Heine | |
| 2007/0261413 A1 | 11/2007 | Hatamian et al. | |
| 2007/0261548 A1 | 11/2007 | Vrzalik et al. | |
| 2007/0262621 A1 | 11/2007 | Dong et al. | |
| 2007/0296251 A1 | 12/2007 | Krobok et al. | |
| 2008/0000025 A1 | 1/2008 | Feher | |
| 2008/0000511 A1 | 1/2008 | Kuroyanagi et al. | |
| 2008/0022694 A1 | 1/2008 | Anderson et al. | |
| 2008/0023056 A1 | 1/2008 | Kambe et al. | |
| 2008/0028536 A1 | 2/2008 | Hadden-Cook | |
| 2008/0028768 A1 | 2/2008 | Goenka | |
| 2008/0028769 A1 | 2/2008 | Goenka | |
| 2008/0053108 A1 | 3/2008 | Wen | |
| 2008/0053509 A1 | 3/2008 | Flitsch et al. | |
| 2008/0077211 A1 | 3/2008 | Levinson et al. | |
| 2008/0078186 A1 | 4/2008 | Cao | |
| 2008/0084095 A1 | 4/2008 | Wolas | |
| 2008/0087316 A1 | 4/2008 | Inaba et al. | |
| 2008/0124234 A1 | 5/2008 | Echazarreta | |
| 2008/0154518 A1 | 6/2008 | Manaka et al. | |
| 2008/0155990 A1 | 7/2008 | Gupta et al. | |
| 2008/0163916 A1 | 7/2008 | Tsuneoka et al. | |

(56) References Cited

U.S. PATENT DOCUMENTS

| | | |
|---|---|---|
| 2008/0164733 A1 | 7/2008 | Giffin et al. |
| 2008/0166224 A1 | 7/2008 | Giffin et al. |
| 2008/0245092 A1 | 10/2008 | Forsberg et al. |
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0015042 A1 | 1/2009 | Bargheer et al. |
| 2009/0026813 A1 | 1/2009 | Lofy |
| 2009/0031742 A1 | 2/2009 | Seo et al. |
| 2009/0033130 A1 | 2/2009 | Marquette et al. |
| 2009/0106907 A1 | 4/2009 | Chambers |
| 2009/0108094 A1 | 4/2009 | Ivri |
| 2009/0121524 A1 | 5/2009 | Abe et al. |
| 2009/0126110 A1 | 5/2009 | Feher |
| 2009/0151909 A1 | 6/2009 | Yang |
| 2009/0178700 A1 | 7/2009 | Heremans et al. |
| 2009/0203120 A1 | 8/2009 | Shin et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0250980 A1 | 10/2009 | Major et al. |
| 2009/0263242 A1 | 10/2009 | Winkler et al. |
| 2009/0269584 A1 | 10/2009 | Bell et al. |
| 2009/0293488 A1 | 12/2009 | Coughlan, III et al. |
| 2010/0031987 A1 | 2/2010 | Bell et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0198322 A1 | 8/2010 | Joseph et al. |
| 2010/0303647 A1 | 12/2010 | Ida et al. |
| 2010/0307168 A1 | 12/2010 | Kohl et al. |
| 2011/0017421 A1 | 1/2011 | Esaki |
| 2011/0061400 A1 | 3/2011 | Park et al. |
| 2011/0061401 A1 | 3/2011 | Jun et al. |
| 2011/0061403 A1 | 3/2011 | Jun et al. |
| 2011/0066217 A1 | 3/2011 | Diller et al. |
| 2011/0101741 A1 | 5/2011 | Kolich |
| 2011/0192173 A1 | 8/2011 | Walter et al. |
| 2011/0271994 A1 | 11/2011 | Gilley |
| 2011/0289684 A1 | 12/2011 | Parish et al. |
| 2012/0000901 A1 | 1/2012 | Bajic et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0132242 A1 | 5/2012 | Chu et al. |
| 2012/0144844 A1 | 6/2012 | Park et al. |
| 2012/0145215 A1 | 6/2012 | Hwang et al. |
| 2012/0174956 A1 | 7/2012 | Smythe et al. |
| 2012/0198616 A1 | 8/2012 | Makansi et al. |
| 2012/0201008 A1 | 8/2012 | Hershberger et al. |
| 2012/0235444 A1 | 9/2012 | Dilley et al. |
| 2012/0239123 A1 | 9/2012 | Weber et al. |
| 2012/0256451 A1 | 10/2012 | Sahashi |
| 2012/0261399 A1 | 10/2012 | Lofy |
| 2012/0289761 A1 | 11/2012 | Boyden et al. |
| 2012/0325281 A1 | 12/2012 | Akiyama |
| 2013/0008181 A1 | 1/2013 | Makansi et al. |
| 2013/0028765 A1 | 1/2013 | Yokozawa et al. |
| 2013/0097777 A1 | 4/2013 | Marquette et al. |
| 2013/0113239 A1* | 5/2013 | Akaike ............... B60N 2/5685 |
| | | 297/180.1 |
| 2013/0125563 A1 | 5/2013 | Jun |
| 2013/0200424 A1 | 8/2013 | An et al. |
| 2013/0232996 A1 | 9/2013 | Goenka et al. |
| 2013/0239592 A1 | 9/2013 | Lofy |
| 2014/0014871 A1 | 1/2014 | Haddon et al. |
| 2014/0026320 A1 | 1/2014 | Marquette et al. |
| 2014/0030082 A1 | 1/2014 | Helmenstein |
| 2014/0090513 A1 | 4/2014 | Zhang et al. |
| 2014/0113536 A1 | 4/2014 | Goenka et al. |
| 2014/0131343 A1 | 5/2014 | Walsh |

| | | |
|---|---|---|
| 2014/0137569 A1 | 5/2014 | Parish et al. |
| 2014/0159442 A1 | 6/2014 | Helmenstein |
| 2014/0165608 A1 | 6/2014 | Tseng |
| 2014/0180493 A1 | 6/2014 | Csonti et al. |
| 2014/0182646 A1 | 7/2014 | Choi et al. |
| 2014/0187140 A1 | 7/2014 | Lazanja et al. |
| 2014/0194959 A1 | 7/2014 | Fries et al. |
| 2014/0230455 A1 | 8/2014 | Chandler et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0338366 A1 | 11/2014 | Adldinger et al. |
| 2015/0033764 A1 | 2/2015 | Gurevich et al. |
| 2015/0116943 A1 | 4/2015 | Olsson et al. |
| 2015/0118482 A1 | 4/2015 | Kagawa |
| 2015/0165865 A1 | 6/2015 | Park et al. |
| 2015/0217665 A1* | 8/2015 | Hickey ................ B60N 2/5621 |
| | | 297/180.1 |
| 2015/0231636 A1 | 8/2015 | Lim et al. |
| 2015/0238020 A1 | 8/2015 | Petrovski et al. |
| 2015/0298524 A1 | 10/2015 | Goenka |
| 2016/0030234 A1 | 2/2016 | Lofy et al. |
| 2016/0031348 A1* | 2/2016 | Kurosawa ............ B60N 2/5635 |
| | | 297/180.1 |
| 2016/0035957 A1 | 2/2016 | Casey |
| 2016/0039321 A1 | 2/2016 | Dacosta-Mallet et al. |
| 2016/0133817 A1 | 5/2016 | Makansi et al. |
| 2016/0280038 A1* | 9/2016 | Tanaka ................... B60H 1/244 |
| 2016/0325657 A1 | 11/2016 | Zhang et al. |
| 2017/0047500 A1 | 2/2017 | Shiraishi et al. |
| 2017/0066355 A1 | 3/2017 | Kozlowski |
| 2017/0071359 A1 | 3/2017 | Petrovski et al. |
| 2017/0200992 A1 | 7/2017 | Piggott et al. |
| 2017/0268803 A1 | 9/2017 | Cauchy |
| 2017/0365764 A1 | 12/2017 | Shingai et al. |
| 2018/0111527 A1 | 4/2018 | Tait et al. |
| 2018/0123013 A1 | 5/2018 | Williams et al. |
| 2018/0170223 A1 | 6/2018 | Wolas |
| 2018/0172325 A1 | 6/2018 | Inaba et al. |
| 2018/0251008 A1* | 9/2018 | Androulakis ........ B60N 2/5621 |
| 2018/0279416 A1 | 9/2018 | Sajic et al. |
| 2018/0290574 A1 | 10/2018 | Kozlowski |
| 2019/0051807 A1 | 2/2019 | Okumura et al. |
| 2019/0086133 A1 | 3/2019 | Popli et al. |
| 2019/0268975 A1 | 8/2019 | Kim |
| 2019/0331380 A1 | 10/2019 | Seiler et al. |
| 2020/0035898 A1 | 1/2020 | Jovovic et al. |
| 2021/0370746 A1 | 12/2021 | Pacilli et al. |
| 2022/0000191 A1 | 1/2022 | Cauchy |
| 2022/0169158 A1 | 6/2022 | Cauchy |
| 2022/0381262 A1 | 12/2022 | Lofy et al. |
| 2024/0140165 A1 | 5/2024 | Chewter et al. |
| 2024/0288005 A1 | 8/2024 | Lofy et al. |

FOREIGN PATENT DOCUMENTS

| | | |
|---|---|---|
| CN | 2155318 | 2/1994 |
| CN | 1299950 | 6/2001 |
| CN | 1320087 | 10/2001 |
| CN | 1513699 | 7/2004 |
| CN | 1535220 | 10/2004 |
| CN | 1929761 | 3/2007 |
| CN | 101 033 878 | 9/2007 |
| CN | 101 097 986 | 1/2008 |
| CN | 101 219 025 | 7/2008 |
| CN | 101 332 785 | 12/2008 |
| CN | 102 019 866 | 4/2011 |
| CN | 102 801 105 | 11/2012 |
| CN | 104 282 643 | 1/2015 |
| CN | 204 157 198 | 2/2015 |
| CN | 106 937 799 | 7/2017 |
| CN | 108 778 802 | 11/2018 |
| CN | 208 355 060 | 1/2019 |
| CN | 111 306 838 | 6/2020 |
| CZ | 288460 | 6/2001 |
| DE | 195 03 291 | 8/1996 |
| DE | 199 12 764 | 9/2000 |
| DE | 299 11 519 | 11/2000 |

(56)  References Cited

FOREIGN PATENT DOCUMENTS

| | | |
|---|---|---|
| DE | 102 38 552 | 8/2001 |
| DE | 101 15 242 | 10/2002 |
| DE | 202 17 645 | 3/2003 |
| DE | 201 20 516 | 4/2003 |
| DE | 10 2009 036 332 | 2/2011 |
| DE | 10 2018 203 701 | 9/2018 |
| EP | 0 424 160 | 4/1991 |
| EP | 0 411 375 | 5/1994 |
| EP | 0 621 026 | 10/1994 |
| EP | 0 834 421 | 4/1998 |
| EP | 0 862 901 | 9/1998 |
| EP | 1 486 143 | 12/2004 |
| EP | 1 598 223 | 11/2005 |
| EP | 1 972 312 | 9/2008 |
| EP | 1 845 914 | 9/2009 |
| EP | 2 098 733 | 9/2009 |
| EP | 2 396 619 | 8/2015 |
| EP | 2 921 083 | 9/2015 |
| FR | 2 882 307 | 8/2006 |
| FR | 2 893 826 | 6/2007 |
| GB | 874660 | 8/1961 |
| GB | 978057 | 12/1964 |
| GB | 1 435 831 | 5/1976 |
| JP | 56-097416 | 8/1981 |
| JP | 60-080044 | 5/1985 |
| JP | 60-085297 | 5/1985 |
| JP | 01-281344 | 11/1989 |
| JP | 04-052470 | 6/1990 |
| JP | 04-165234 | 6/1992 |
| JP | 05-026762 | 2/1993 |
| JP | 05-069731 A | 3/1993 |
| JP | 05-147423 | 6/1993 |
| JP | 05-277020 | 10/1993 |
| JP | 10-044756 | 2/1998 |
| JP | 10-227508 | 8/1998 |
| JP | 10-297243 | 11/1998 |
| JP | 10-297274 | 11/1998 |
| JP | 10-332883 | 12/1998 |
| JP | 2000-060681 | 2/2000 |
| JP | 2000-164945 | 6/2000 |
| JP | 2000-244024 | 9/2000 |
| JP | 2000-325384 | 11/2000 |
| JP | 2001-174028 | 6/2001 |
| JP | 2001-208405 | 8/2001 |
| JP | 2002-514735 | 5/2002 |
| JP | 2002-227798 | 8/2002 |
| JP | 2002-234332 | 8/2002 |
| JP | 2003-042594 | 2/2003 |
| JP | 2003-174203 | 6/2003 |
| JP | 2003-204087 | 7/2003 |
| JP | 2003-254636 | 9/2003 |
| JP | 2004-017855 | 1/2004 |
| JP | 2004-055621 | 2/2004 |
| JP | 2004-079883 | 3/2004 |
| JP | 2004-174138 | 6/2004 |
| JP | 2005-079210 | 2/2005 |
| JP | 2005-251950 | 9/2005 |
| JP | 2005-303183 | 10/2005 |
| JP | 2005-333083 | 12/2005 |
| JP | 2006-001392 | 1/2006 |
| JP | 2006-021572 | 1/2006 |
| JP | 2006-069376 | 3/2006 |
| JP | 2006-076398 | 3/2006 |
| JP | 2006-123874 | 5/2006 |
| JP | 2006-341841 | 12/2006 |
| JP | 2007-506523 | 3/2007 |
| JP | 2007-506526 | 3/2007 |
| JP | 2007-126047 | 5/2007 |
| JP | 2007-240046 | 9/2007 |
| JP | 2008-012498 | 1/2008 |
| JP | 2008-529894 | 8/2008 |
| JP | 2008-274790 | 11/2008 |
| JP | 2009-077760 | 4/2009 |
| JP | 2010-000253 | 1/2010 |
| JP | 2010-052494 | 3/2010 |
| JP | 2011-189764 | 9/2011 |
| JP | 2013-184588 | 9/2013 |
| JP | 2013-203196 | 10/2013 |
| JP | 2014-135455 | 7/2014 |
| JP | 2017-518912 | 7/2017 |
| JP | 2017-171129 | 9/2017 |
| JP | 2018-012498 | 1/2018 |
| KR | 10-2001-0060500 | 7/2001 |
| KR | 10-2005-0011494 | 1/2005 |
| KR | 10-2012-0100237 | 9/2012 |
| KR | 10-1524090 | 5/2015 |
| KR | 10-1873857 | 7/2018 |
| LU | 66619 | 2/1973 |
| RU | 2562507 | 9/2015 |
| WO | WO 94/20801 | 9/1994 |
| WO | WO 95/14899 | 6/1995 |
| WO | WO 95/31688 | 11/1995 |
| WO | WO 96/05475 | 2/1996 |
| WO | WO 98/07898 | 2/1998 |
| WO | WO 98/31311 | 7/1998 |
| WO | WO 99/23980 | 5/1999 |
| WO | WO 99/44552 | 9/1999 |
| WO | WO 99/58907 | 11/1999 |
| WO | WO 02/11968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/065987 | 7/2005 |
| WO | WO 2005/073021 | 8/2005 |
| WO | WO 2005/105516 | 11/2005 |
| WO | WO 2005/115794 | 12/2005 |
| WO | WO 2006/037178 | 4/2006 |
| WO | WO 2006/041935 | 4/2006 |
| WO | WO 2006/078394 | 7/2006 |
| WO | WO 2006/102509 | 9/2006 |
| WO | WO 2006/117690 | 11/2006 |
| WO | WO 2007/060371 | 5/2007 |
| WO | WO 2007/089789 | 8/2007 |
| WO | WO 2008/023942 | 2/2008 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |
| WO | WO 2010/129803 | 11/2010 |
| WO | WO 2011/026040 | 3/2011 |
| WO | WO 2011/156643 | 12/2011 |
| WO | WO 2012/061777 | 5/2012 |
| WO | WO 2013/052823 | 4/2013 |
| WO | WO 2013/151903 | 10/2013 |
| WO | WO 2014/164887 | 10/2014 |
| WO | WO 2015/171901 | 11/2015 |
| WO | WO 2016/077843 | 5/2016 |
| WO | WO 2017/059256 | 4/2017 |
| WO | WO 2017/066261 | 4/2017 |
| WO | WO 2017/083308 | 5/2017 |
| WO | WO 2017/086043 | 5/2017 |
| WO | WO 2017/100718 | 6/2017 |
| WO | WO 2017/136793 | 8/2017 |
| WO | WO 2017/145630 | 8/2017 |
| WO | WO 2017/163580 | 9/2017 |
| WO | WO 2018/175506 | 9/2018 |
| WO | WO 2019/173553 | 9/2019 |
| WO | WO 2019/226968 | 11/2019 |
| WO | WO 2020/112902 | 6/2020 |
| WO | WO 2020/172255 | 8/2020 |
| WO | WO 2020/180632 | 9/2020 |
| WO | WO 2021/025663 | 2/2021 |
| WO | WO 2022/198216 | 9/2022 |
| WO | WO 2022/198217 | 9/2022 |

(56)            References Cited

FOREIGN PATENT DOCUMENTS

OTHER PUBLICATIONS

U.S. Appl. No. 15/685,912, filed Aug. 24, 2017, Petrovski et al.
U.S. Appl. No. 16/277,765, filed Feb. 15, 2019, Petrovski et al.
U.S. Appl. No. 18/310,474, filed May 1, 2023, Cauchy.
Feher, S., "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
Geng, S. et al., *Modern Family Practical Encyclopedia*, Jilin Science and Technology Press, Sep. 1985, p. 679.
Lofy, J., et al., "Thermoelectrics for Environmental Control in Automobiles", Proceeding of Twenty-First International Conference on Thermoelectrics (ICT 2002), 2002, pp. 471-476.
Luo, Z., "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
Zhou, Z. et al., "Design features of the air-conditioner used for elevators and a comparison between techniques for eliminating condensation water", Energy Research and Information, 2002, vol. 18, No. 3, pp. 156-161.
Chinese Office Action in Chinese Application No. 201811430679.2, dated Nov. 26, 2021.
International Search Report and Written Opinion received in PCT Application No. PCT/US2022/071182, dated May 16, 2022.
International Preliminary Report on Patentability received in PCT Application No. PCT/US2022/071182 dated Sep. 28, 2023.

* cited by examiner

PRECONDITIONING SURFACES USING INTELLIGENT THERMAL EFFECTORS

CROSS REFERENCE

This application claims the benefit of U.S. Patent Application No. 63/162,973, filed Mar. 18, 2021, the entirety of which is hereby incorporated by reference.

BACKGROUND

Field

This disclosure generally relates to thermoelectric climate conditioning systems.

Related Art

Climate control systems, such as heating systems and air conditioning systems, can be used to thermally condition extensive areas, such as entire buildings, suites, or individual rooms. The cabin space of a vehicle is also typically conditioned as a unit using conventional climate control systems. However, more selective environmental conditioning can also be desirable in many contexts such as, for example, the heating or cooling of a passenger seat in a vehicle. Accordingly, various types of individualized climate control systems for vehicle seats and other environments have been used.

SUMMARY

According to one aspect, a control method for conditioning a surface with a thermal conditioning system having a thermoelectric device (TED), includes determining whether the surface is occupied, providing power to the TED, the TED including a main side and a waste side, providing an airflow with a blower, and adjusting a proportion of the airflow between a main side flow path across the main side of the TED and a waste side flow path across the waste side of the TED based on whether the surface is occupied.

According to another aspect, determining whether the surface is occupied is based on a signal received from a force sensor in a vehicle seat. According to another aspect, determining whether the surface is occupied is based on whether a vehicle is remotely started. According to another aspect, the control method is a startup mode. According to another aspect, determining whether the surface is occupied is based on comparing a delta-T between the temperature of the TED and a temperature of ambient cabin air with an expected delta-T between the temperature of the TED and the temperature of ambient cabin air based at least on a position of a flow control valve. According to another aspect, the thermal conditioning system is operated in a heater mode. According to another aspect, the thermal conditioning system is operated in a cooling mode. According to another aspect, the power provided to the TED is based on whether the surface is occupied. According to another aspect, the power provided to the TED is based on the surface being determined to be unoccupied. According to another aspect, the power provided to the TED is 100%. According to another aspect, adjusting the proportion of the airflow between the main side flow path and the waste side flow path includes adjusting a position of a flow control valve to a first position. According to another aspect, the first position of the flow control valve is based on the surface being determined to be unoccupied. According to another aspect, the first position of the flow control valve directs the airflow between the main side flow path and the waste side flow path at a ratio between 1:99 and 30:70. According to another aspect, adjusting the flow control valve to a second position is based on detecting a set temperature of the airflow. According to another aspect, the second position of the flow control valve directs more airflow along the main side flow path than in the first position. According to another aspect, the second position of the flow control valve directs the airflow between the main side flow path and the waste side flow path at a ratio between 30:70 and 95:5. According to another aspect, regulating the power provided to the TED is based on detecting the set temperature of the airflow. According to another aspect, the power provided to the TED is reduced based on detecting the set temperature. According to another aspect, adjusting the flow control valve to a third position is based on an in-cabin air temperature. According to another aspect, the third position closes the waste side flow path. According to another aspect, the in-cabin air temperature is based on a signal from an NTC. According to another aspect, the power provided to the TED is reduced based on the in-cabin air temperature. According to another aspect, the power provided to the TED is shut off. According to another aspect, increasing a speed of the blower increases a speed of the airflow. According to another aspect, the first position of the flow control valve is based on the surface being determined to be occupied. According to another aspect the first position of the flow control valve directs the airflow between the main side flow path and the waste side flow path at a ratio between 30:70 and 95:5. According to another aspect adjusting the flow control valve to a second position is based on determining that the surface has changed from unoccupied to occupied. According to another aspect the second position of the flow control valve directs more airflow along the main side flow path than in the first position. According to another aspect adjusting the flow control valve to a third position is based on an in-cabin air temperature.

According to a second aspect, a thermal conditioning system for conditioning a surface includes a thermoelectric device (TED) with a main side and a waste side. An airflow path extends along a main side flow path on the main side of the TED and along a waste side flow path along the waste side of the TED. A processor couples with a non-transitory computer readable medium containing a set of instructions, the instructions, when executed by the processor, configured to: determine whether the surface is occupied, provide power to the TED; provide an airflow along the airflow path with a blower; and adjust a proportion of the airflow between the main side flow path and the waste side flow path based on whether the surface is occupied.

According to another aspect, determining whether the surface is occupied is based on a signal received from a force sensor in a vehicle seat. According to another aspect, determining whether the surface is occupied is based on whether a vehicle is remotely started. According to another aspect, determining whether the surface is occupied is based on comparing a delta-T between the temperature of the TED and a temperature of ambient cabin air with an expected delta-T between the temperature of the TED and the temperature of ambient cabin air based at least on a position of a flow control valve. According to another aspect, the power provided to the TED is based on whether the surface is occupied. According to another aspect, adjusting the proportion of the airflow between the main side flow path and the waste side flow path includes adjusting a position of a flow control valve to a first position. According to another aspect, the first position of the flow control valve is based on the surface being determined to be unoccupied. According to another aspect, the first position of the flow control valve directs the airflow between the main side flow path and the waste side flow path at a ratio between 1:99 and 30:70. According to another aspect, adjusting the flow control valve to a second position is based on detecting a set temperature of the airflow. According to another aspect, the second position of the flow control valve directs more airflow along the main side flow path than in the first position. According to another aspect, the second position of the flow control valve directs the airflow between the main side flow path and the waste side flow path at a ratio between 30:70 and 95:5. According to another aspect, regulating the power provided to the TED is based on detecting the set temperature of the airflow. According to another aspect, the power provided to the TED is reduced based on detecting the set temperature. According to another aspect, the instructions, when executed by the processor, are further configured to adjust the flow control valve to a third position based on an in-cabin air temperature. According to another aspect, the third position closes the waste side flow path. According to another aspect, the in-cabin air temperature is based on a signal from an NTC. According to another aspect, the power provided to the TED is reduced based on the in-cabin air temperature. According to another aspect, the power provided to the TED is shut off. According to another aspect, the instructions, when executed by the processor, are further configured to increase a speed of the blower to increase a speed of the airflow. According to another aspect, the first position of the flow control valve is based on the surface being determined to be occupied. According to another aspect, the first position of the flow control valve directs the airflow between the main side flow path and the waste side flow path at a ratio between 30:70 and 95:5. According to another aspect, the instructions, when executed by the processor, are further configured to adjust the flow control valve to a second position based on determining that the surface has changed from unoccupied to occupied. According to another aspect, the second position of the flow control valve directs more airflow along the main side flow path than in the first position. According to another aspect, the instructions, when executed by the processor, are further configured to adjust the flow control valve to a third position based on an in-cabin air temperature.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Thermal Conditioning Systems

In various scenarios, it can be desirable to pre-heat or pre-cool a touch surface to a pre-set temperature before that surface is occupied using a thermal conditioning system. As one example, the touch surfaces in a vehicle seat may be uncomfortably hot or cold depending on the exterior or interior environment of the vehicle. The touch surfaces of a vehicle seat within a vehicle parked during wintertime in a non-climate controlled environment may require pre-heating to a comfortable temperature. Likewise, the touch surfaces of a vehicle seat within a vehicle parked in the sun during summer may require pre-cooling to a comfortable temperature.

Existing gross climate control technologies can precondition a touch surface through contact with the ambient air, such as the air-conditioning within a vehicle cabin. Nevertheless, a more targeted preconditioning system offers various advantages over existing systems. Thermal conditioning systems can have a faster effect on the touch surface and achieve such effects in a more efficient manner. Moreover, targeting specific touch surfaces for preconditioning can facilitate a more comfortable user experience without wasting energy on non-touch surfaces. In the context of an automobile, touch surfaces may commonly include seats, arm rests, head rests, and/or other surfaces within a vehicle cabin.

Figure 1:
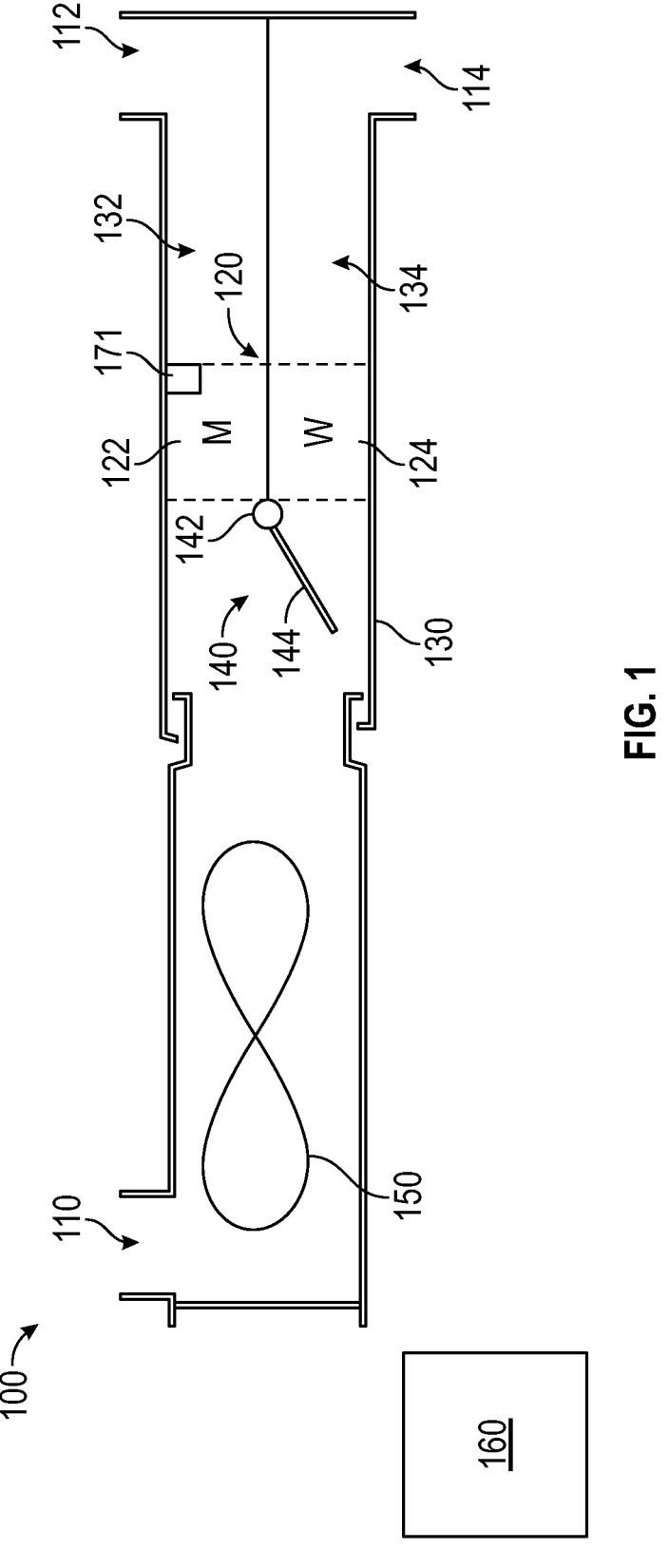
FIG. 1 shows a thermal conditioning system including a blower for providing an airflow across main and waste sides of a thermoelectric device (TED) and a flow control valve for dividing the airflow between the main and waste sides.

FIG. 1 shows an implementation of a thermal conditioning system 100 suitable for use to precondition a touch surface. The thermal conditioning system 100 can be used to deliver conditioned (e.g., heated, cooled, dried, and/or wetted) air to a climate-controlled device or environment. In an exemplary implementation, the thermal conditioning system 100 can deliver conditioned air into a vehicle seat, such as through one or more passages or channels within the vehicle seat. The thermal conditioning system 100 can also be used to provide conditioned air to various other spaces or components such as head rests, arm rests, an enclosed spaces, beds, furniture, or any touch surface that may benefit from thermal conditioning. Other implementations of thermal conditioning systems are described in WO 2020/112902, the entirety of which is hereby incorporated by reference.

The thermal conditioning system 100 can include a flow path therethrough. The flow path can extend through an outer housing 130 of the thermal conditioning system 100. The flow path can include an inlet 110 and one or more outlets 112, 114. Fluid, such as ambient air, can be drawn in through the inlet 110, conditioned using one or more conditioning elements within the system 100, and exhausted through the outlet(s) 112, 114, at least one of which provides conditioned air to the desired location.

The conditioning elements of the thermal conditioning system 100 can include a thermoelectric device (TED) 120. The TED 120 can be a Peltier device. The TED 120 can include a main-side 122 and a waste side 124. The flow path can include a main side flow path 132 that extends across the main side 122 of the TED 120 to the main outlet 112. The flow path can include a waste side flow path 134 that extends across the waste side 124 of the TED 120 to the waste outlet 114. The main-side flow path 132 can terminate at the climate-controlled environment or passageway thereto. The waste-side flow path 134 can terminate at an exhaust. The main and waste sides 122, 124 can each include a heat exchanger, such as one or more fins to enhance heat transfer between the TED 120 and the airflow passing along the respective main and/or waste side flow paths 132, 134.

The TED 120 can be connected with an voltage or amperage source such that the TED heats one side and cools the opposite side. Modification of the applied voltage or amperage can cause cooling of the main side 122 and heating of the waste side 124, or operated in the reverse polarity to cool the waste side 124 and heat the main side 122. When used as a cooling device, the main-side 122 can be colder than the waste side 124. When used as a heating device, the main-side 122 can be hotter than the waste side 124. The amount of power provided to the TED 120 can be adjusted using a duty cycle through pulse-width modulation (PWM). The TED 120 may include a temperature sensor 171, such as an NTC. The heat sensor may be located on the main side 122, such as on one of the fins.

The thermal conditioning system 100 can include or be used in combination with a blower 150, or other fluid moving device. The blower 150 can include a motor for driving one or more blades. A speed of the blower 150 can controlled based on application of a voltage and/or amperage to the motor. The blower 150 can deliver the airflow (e.g., ambient air or another fluid) along the flow path through the thermal conditioning system 100. The blower 150 can draw air in from the inlet 110 and move the air along the flow path past the TED 120 to outlets 112, 114. In the illustrated system 100, the blower 150 can be positioned, in general, upstream of the conditioning elements of the thermal conditioning system 100. However, in other implementations, a blower 150 can be positioned downstream of the conditioning elements in addition to or in the alternative to an upstream blower.

The thermal conditioning system 100 can include a flow control valve 140. The flow control valve 140 can portion the airflow provided by the blower 150 between the main and waste-side flow paths 132, 134. The flow control valve 140 can be upstream of the TED 120. The flow control valve 140 can include a louver or flap 144. The flap 144 can be connected with a movable pivot 142. A position of the flap 144 and pivot 142 can be controlled by a motor (e.g., a servo, step, or other motor type) or other actuator. The flap 144 can be pivotable about the pivot 142 through an angle A. The angle A can vary to fully or partially close each of the main side flow path 132 and the waste side flow path 134. The effect of the position of the flap 144 on the temperature of the conditioned air at the outlet 112 is further described in WO 2020/112902.

In the illustrated implementation, the flow control valve 140 is in the form of a flap valve, however other types of valves could be used such as needle, barrel or rotary valves and/or a combination of such valves. Moreover, it is anticipated that in other implementations the flow control valve 140 can be positioned downstream of the TED 120 and/or that additional valves can be provided. For example, individual valves could be provided each of the main and waste side flow paths 132, 134.

The system 100 can further include or be connected with a controller 160. The controller 160 may include a singular unit or distributed across several devices. The controller 160 can include a processor and a non-transitory computer readable medium configured to store instructions that are executable by the processor to operate the system 100 according to one or more control instructions and methods, as discussed further below. Operation of the system 100 by the controller 160 can be based adjusting operation of one or more of the components thereof. A primary control mechanism of the system 100 can be to adjust the power supplied to the TED 120 (e.g. by controlling the duty cycle that regulates the electrical power supplied to the TED). The power provided to the TED 120 may have the largest impact on total electrical power consumption of the system 100. A secondary control mechanism of the system 100 is adjusting the position of the flow control valve 140. The position of the flow control valve 140 controls the portion of the total air flow that passes the main side of the TED 120 and can adjust the temperature and amount of the airflow passing to the outlet 112 and/or outlet 114. A tertiary control mechanism of the system 100 is to regulate the speed of the blower 150. The blower 150 can control the total air flow rate through the system 100 and accordingly the temperature and amount of the airflow passing therethrough to the outlet 112.

Figures 2A, 2B, 2C:
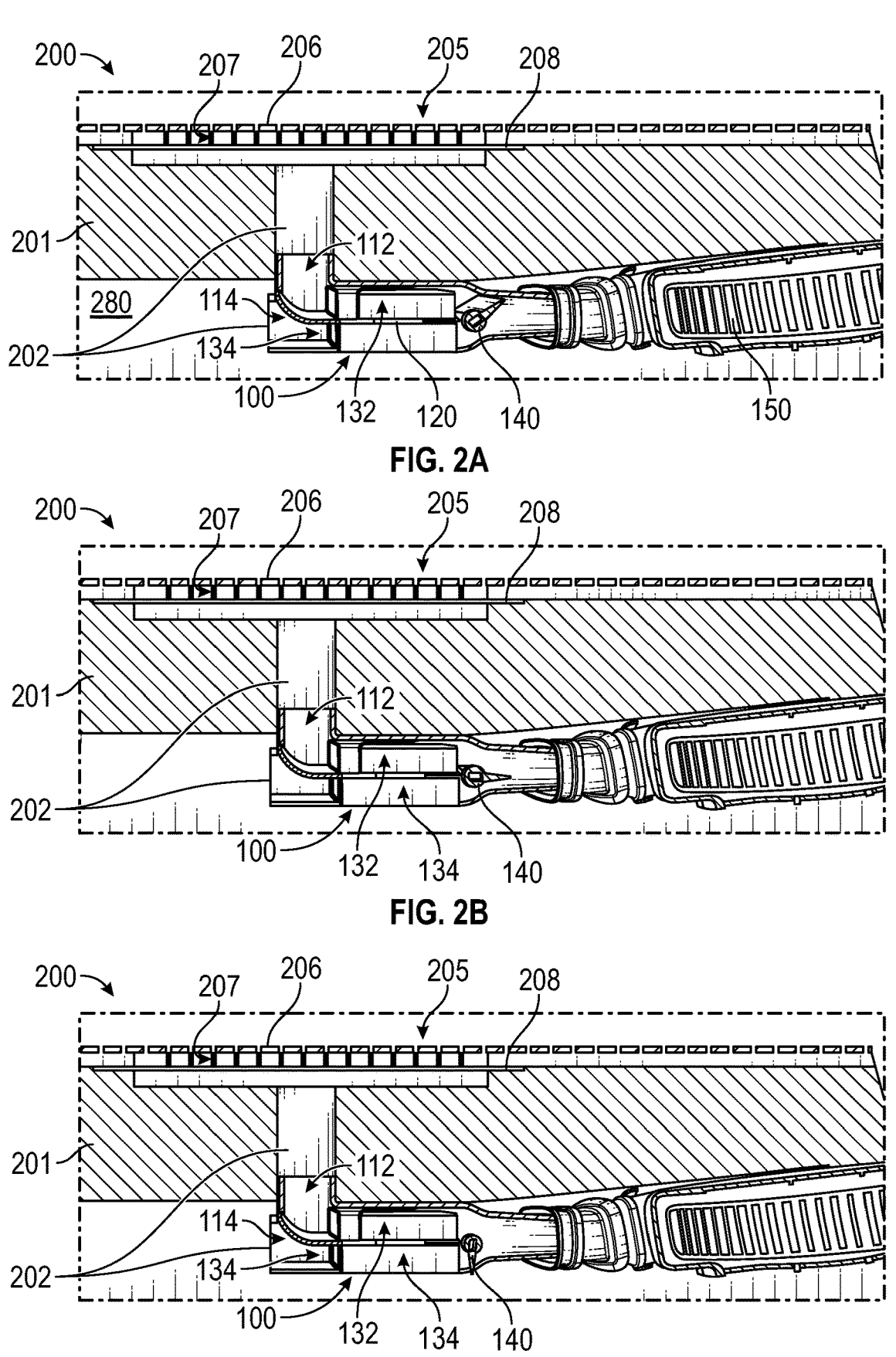
FIG. 2A shows a cross sectional view of a seat including the thermal conditioning system in a low-flow/high delta-T configuration with the flow control valve primarily blocking airflow over the main side of the TED.
FIG. 2B shows the cross sectional view of the seat including the thermal conditioning system in a median or nominal-flow configuration with the flow control valve allowing airflow over the main side and waste side of the TED.
FIG. 2C shows a cross sectional view of a seat including the thermal conditioning system in a vent or high-flow configuration with the flow control valve blocking airflow over the waste side of the TED.

FIGS. 2A-C show a seat 200 for use with the thermal conditioning system 100, in one exemplary implementation. The seat 200 can include a cushion 201 covered by one or more internal and/or external layers forming a touch surface 205 of the seat 200. The touch surface can include an upper surface 206. The upper surface 206 can be formed of a flexible material such as natural or synthetic fabrics or leather. The upper surface 206 can be air permeable, perforated or otherwise ventilated to allow the passage of airflow therethrough from the system 100. Internal layers 207 of the touch surface 205 can further include a heater pad 208, spacers, comfort layers, etc. These internal layers may also be ventilated.

The cushion can include one or more passageways 202 in communication with the touch surface 205. The passageways 202 can connect the system 100 with the touch surface 205 by providing a flow path through the seat 200. Specifically, the outlet 112 and/or the waste outlet 114 of the system 100 can connect with the passageways 202 to allow the airflow therethrough. The passageways 202 can enable the flow of air with more or less resistance from the outlet 112 to the touch surface 205. The system 100, or one or more components thereof, can be embedded within the cushion 201 within such the passageways 202. In one implementation, the TED 120, flow control valve 140, and/or blower 150 are contained within the seat 200. Another passageway (not shown) can connect the inlet 110 with ambient air (e.g., contained within the cabin of a vehicle).

Preconditioning Touch Surfaces

The thermal conditioning system 100 can be used to precondition a touch surface, such as the touch surface 205, to a pre-selected temperature. The higher the difference between the pre-selected temperature of the touch surface 205 and the ambient air (delta-T) or surrounding touch surfaces, the more pronounced is the sensation felt by the occupant. The delta-T producible by a thermal conditioning system can be related to the volume of conditioned airflow from such the system. Accordingly, one aspect of the present disclosure includes strategies for preconditioning a touch surface more effectively by modifying the volume of an conditioned airflow.

Another factor that affects the delta-T of a touch surface using a thermal conditioning system is whether the touch surface is occupied or unoccupied. Temperatures of unoccupied touch surfaces can change (either rising or cooling depending on system mode) more slowly than for an occupied surface. Also, energy in the form of heated or cooled air that gets to the surface can quickly be lost to the environment rather than being insulated or absorbed by a seat occupant. This may result in wasted energy, as well as a lower delta-T for the touch surface. Conversely, an occupied touch surface generally inhibits the passage of a conditioned airflow therethrough. Accordingly, generally higher airflow volumes may be used.

Previous active cooling systems do not have ability to vary airflow and temperature to be able to drive to more extreme set point temperatures (higher delta-T) producible by the system 100 in a cooling mode. These systems also do not have the ability to reduce airflow and maintain temperature target simultaneously. Previous active heating systems generally include a thermal barrier between a heater mat and an exterior surface (e.g., seat surface). This thermal barrier slows the transfer of heat to the surface produced at the heater mat. By utilizing the system 100 in heating mode heated air can be forced up to the surface to supplement the heater mat when the seat is unoccupied (e.g., remote/cold start conditions or occupied (e.g., cold start conditions).

Figure 3A:
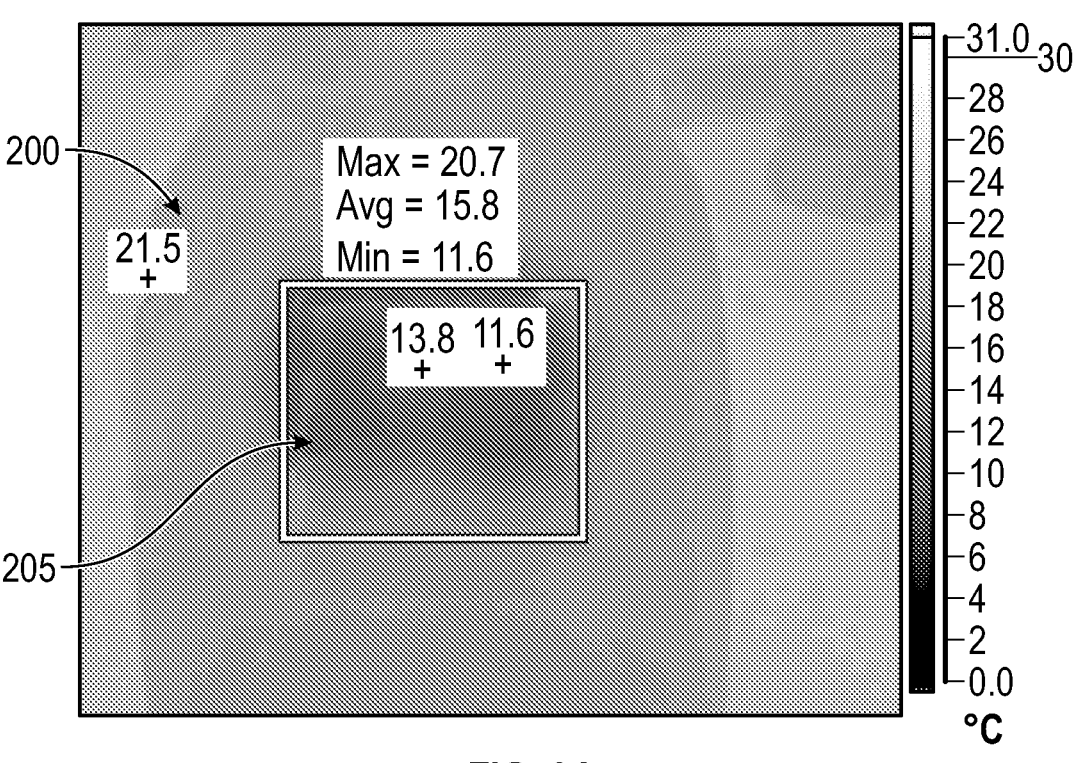
FIG. 3A shows a heat map of the seat surface with the thermal conditioning system in the low-flow/high delta-T configuration.
Figure 3B:
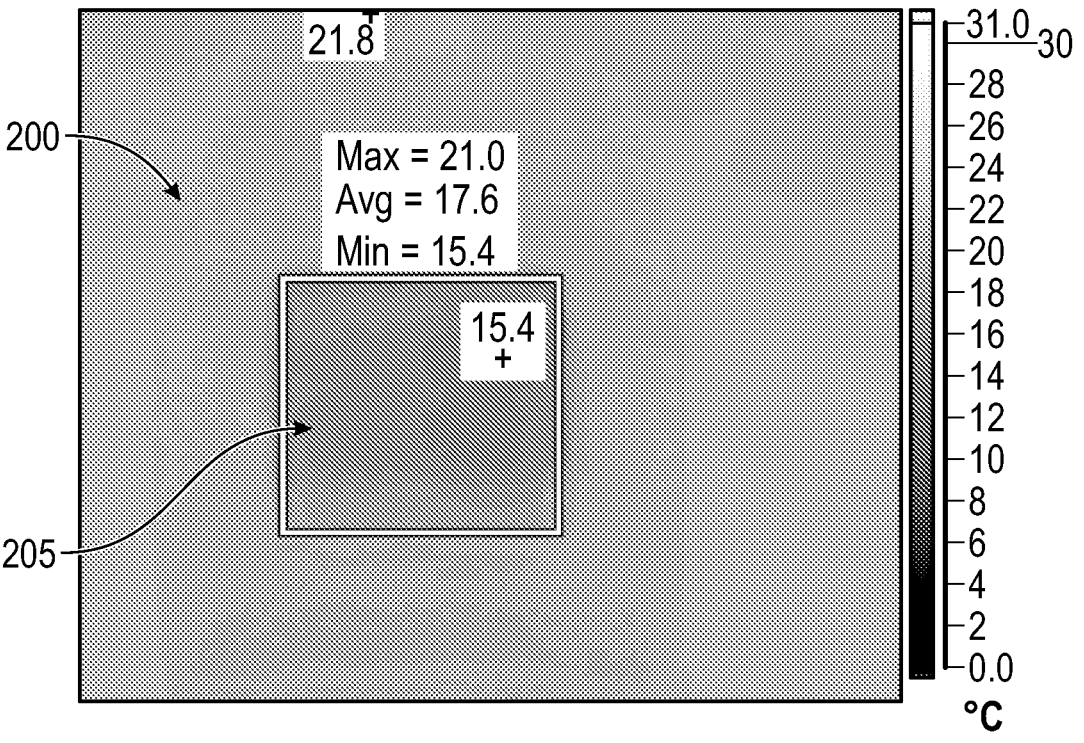
FIG. 3B shows a heat map of the seat surface with the thermal conditioning system in the nominal-flow configuration.

FIGS. 3A-B shows a heat map corresponding to the touch surface 205 of the seat 200 as shown in corresponding FIGS. 2A-B with the system 100 in a cooling mode. In both FIGS. 3A and 3B, the touch surface 205 is unoccupied and exhibits a delta-T relative to adjacent seat surfaces. To achieve the lower touch surface temperature in FIG. 3A (13.8° C.) compared with the delta-T in FIG. 3B (15.4° C.), the system 100 is used in the low-flow/high delta-T configuration, as shown in FIG. 2A. In the low-flow/high delta-T configuration, the flow control valve 140 is positioned to primarily block the airflow from the blower 150 along the main side flow path 132. The ratio of airflow between the main side flow path 132 and the waste side flow path 134 can vary depending on the system 100. In certain implementations of the low-flow/high delta-T configuration, the airflow between the main side flow path 132 and the waste side flow path 134 can be at a ratio of approximately 10:90 or 5:95, or between 1:99 and 30:70 or anywhere between 0:100 and 30:70.

The low-flow/high delta-T configuration is more effective at producing a high delta-T than the nominal-flow configuration for several reasons. First, reducing the airflow along the main side flow path 132 enables the TED 120 to more fully heat or cool the airflow. The temperature of the airflow can approach the temperature of the main side 122 of the TED 120. Second, a lower volume of airflow escapes to the environment through the touch surface 205. The energy contained within the conditioned airflow is more fully transferred into the touch surface 205 because of both the lower volume of air and the higher delta-T. This enables the touch surface 205 to adequately precondition without losing excessive energy into the environment. Third, more waste side airflow allows for more effective removal of waste heat, reducing the temperature of the entire system.

In contrast to the delta-T in FIG. 3A, the delta-T in FIG. 3B is effected by using the system 100 in a nominal-flow configuration, as shown in FIG. 2B. In the nominal-flow configuration, the flow control valve 140 is positioned to primarily allow the airflow from the blower 150 along the main side flow path 132. In certain implementations of the nominal-flow configuration, the airflow between the main side flow path 132 and the waste side flow path 134 can be at a ratio of 50:50, between 40:60 and 60:40, between 30:70 and 95:5, or between 30:70 and 99:1. Allowing high flow on both the main and waste sides of the TED 120 can allow the TED 120 to operate more efficiently than high flow on only a single side.

The nominal-flow configuration for the system 100 can be more effective when the seat 200 is occupied. The occupied seat 200 can block passage of the airflow through the touch surface 205. Accordingly, higher volumes of conditioned airflow (e.g., relative to the low airflow/high delta-T configuration) may be necessary to produce cooling or heating of the touch surface 205. Higher airflow moving across an occupant can result in more evaporative and convective cooling. Moreover, the use of a higher volume of conditioned air may be used to convectively cool the seat occupant. After the set temperature is reached, power to the TED 120 may be reduced to maintain the set temperature (e.g., via duty cycle modification) of the conditioned airflow.

Figure 4:
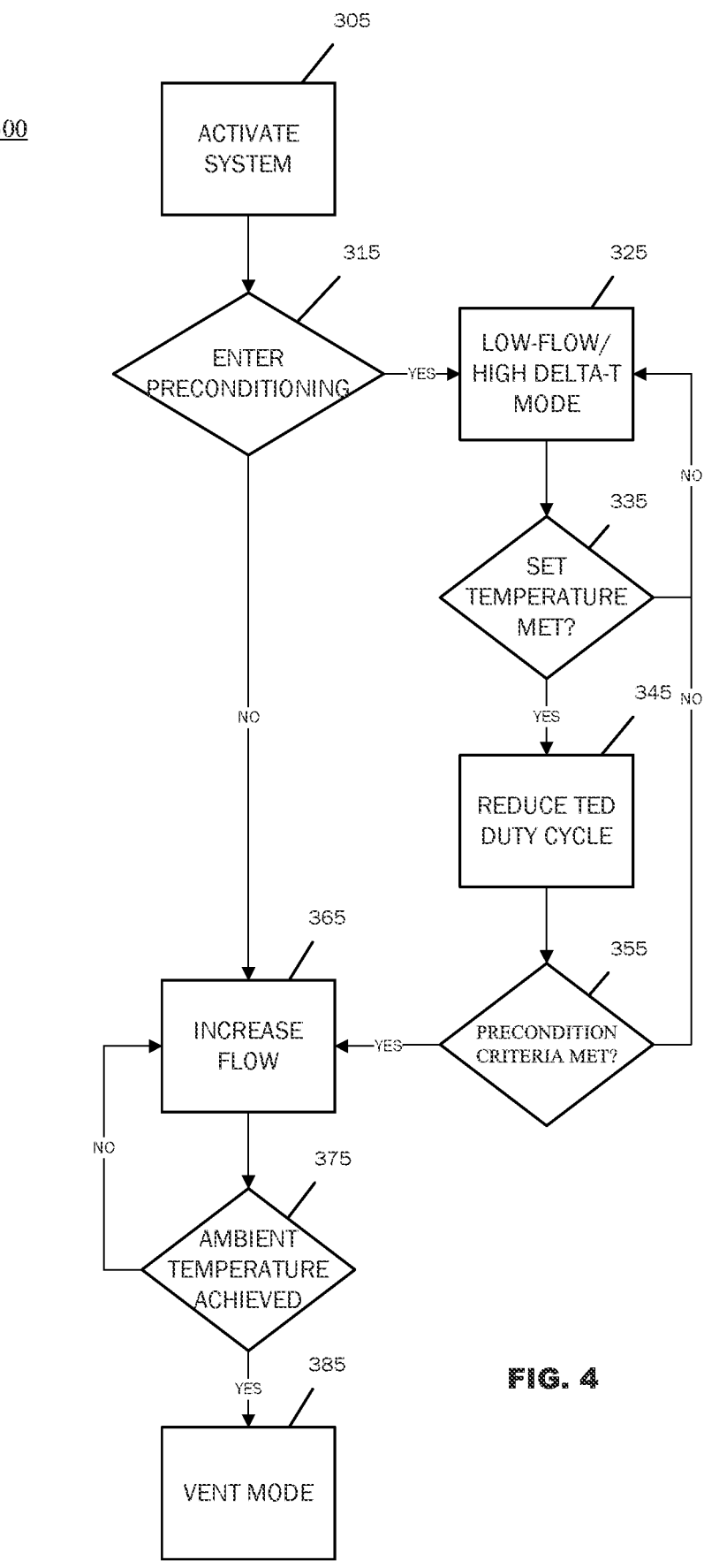
FIG. 4 shows an algorithm for operating the thermal conditioning system for preconditioning a touch surface based on whether the surface is occupied or unoccupied.

FIG. 2C shows the system 100 in a vent configuration with the flow control valve 140 either entirely or mostly blocking airflow across the waste side 124. The TED 120 may also be on a low-duty cycle or entirely shut off. Airflow through the system 100 can be entirely or mostly through the main side flow path 132. The vent configuration can be utilized where the conditions of the air entering the system 100 through the inlet 110 is sufficiently heated or cooled to provide the desirable sensation to the passenger at the seat surface 206. As one example, the cabin air in the vehicle has reached the desired set point temperature, either air conditioned or heated. At that point blowing the cabin air through the system 100 without further cooling can be acceptable for cooling the seat occupant. Generally, the vent configuration is not used for heating purposes. The vent configuration can be used as a drying mode for the components of the system 100 and/or the occupant. The vent configuration can also be used to maximize or otherwise increase evaporative cooling effects under certain environmental conditions FIG. 4 shows a preconditioning method 300 for the exemplary touch surface 205 of the seat 200 using the system 100. At Step 305, the system 100 can be activated. The activation of the system 100 can be done remotely or locally (e.g., based on a user starting or remotely starting a vehicle containing the system 100).

At Step 315, the system 100 can determine whether to activate a heating or cooling mode to precondition the touch surface 205. The preconditioned mode can be entered into automatically as a startup mode when started or be based on whether the seat 200 is occupied (e.g., based on a signal detected by a sensor 280, as shown in FIG. 2A, or received from the vehicle environmental system), whether has been a remote start of the vehicle, or on environmental conditions such as temperatures within the cabin of the vehicle or exterior temperatures or other conditions. The heating or cooling mode can also be entered automatically. An interior or exterior temperature that is higher than the set point temperature of the system 100 (e.g., as received from the vehicle environmental system) can cause the system 100 to enter into a cooling mode. An interior or exterior temperature that is lower than the set point temperature of the system 100 can cause the system 100 to enter into a heating mode.

At Step 325, the system 100 can be set to the low-flow/high delta-T configuration. The low-flow/high delta-T configuration can include a calibrated blower speed and setting the TED power to fully power (e.g., 100%). In this configuration, the system 100 can provide a high delta-T to the touch surface 205. The low-flow/high delta-T configuration can be operated in either the heating or cooling modes. The low-flow/high delta-T configuration can be entered into based on receiving a signal the seat 200 is unoccupied.

At Step 335, the system 100 can remain in the low-flow/high delta-T configuration to precondition the seat 200 with the TED 120 at high (or full) power until the set temperature is reached. The set temperature being reached may be based on a signal from a heat sensor (e.g., NTC) in the system 100, based on a timer, based on a model of the seat 200 and/or cabin conditions. At Step 345, the amount of power provided to the TED 120 can be reduced using a duty cycle through pulse-width modulation (PWM). This can allow maintaining the high delta-T at the seat surface 206 but reduce the overall power that is consumed by the system 100. Generally, the power provided to the TED 120 is the majority of the power used by the system 100. Reducing the power to the TED 120 can be based on achieving the set temperature.

At Step 355, the system 100 can remain in the low-flow/high delta-T configuration based on a preconditioning criteria. If the preconditioning criteria is met, then the system may exit the low-flow/high delta-T configuration. In one option, the system 100 can transition to the nominal-flow configuration described above, or turn off. The response of the system 100 may be based on the preconditioning criteria being met. The preconditioning criteria may include a signal that the seat 200 become occupied, a timer, reaching the set point temperature, comparison with an ambient temperature within the cabin, whether the vehicle is started or shut off, or other criteria. The preconditioning criteria being met at any time during operation of the low-flow/high delta-T configuration and the controller can alter operation of the system 100 accordingly.

At Step 365, the system 100 can increase the speed or volume of the airflow. The system 100 can transition from the low-flow/high delta-T configuration to enter the nominal-flow configuration in either a heating or cooling mode. The flow control valve 140 can be opened to a more neutral position and/or the blower speed of the blower 150 can be increased. In the nominal-flow configuration, the system 100 has the increased ability to change the temperature of the touch surface, particularly if the touch surface 205 is occupied. The system 100 can remain in the nominal-flow configuration until another system criteria is met at Step 375. The transition between the low-flow/high delta-T configuration and the nominal-flow configuration can include movement or movements of the flow control valve 140. This movement can be gradual or sudden. For a gradual movement, the movable flap 144 can pivot a few degrees at a time and be repeated as necessary to complete the transition. For a sudden movement, the movable flap 144 can pivot through large sweeping angles in a short time frame.

At Step 375, an ambient air temperature or set point temperature within the vehicle cabin or ambient environment is reached. Based on this criteria, or another, the system 100 can enter the vent configuration at Step 385. The flow control valve 140 can be moved to block the waste side flow path 134 and/or the blower speed of the blower 150 can be increased. In the vent configuration, the TED can turn off or reduce duty cycle. The blower 150 can blow air from the ambient environment into the passageway 202 to cool the touch surface 205. The system can detect whether the seat 200 remains occupied. The volume of airflow can accordingly be increased to afford adequate ventilation, drying or cooling. In certain implementations, the vent configuration may be used only for cooling the touch surface 205. The transition between the nominal-flow configuration and the vent configuration can include gradual or sudden movement or movements of the flow control valve 140.

Seat Occupation Determination

In certain implementations, whether the seat 200 is occupied can be based on receiving a signal from a sensor (e.g., force sensor 280 on seat 200) or assumed based on a remote start or other criteria. Another aspect of the present disclosure is determining whether the seat 200 is occupied based on the response of the system 100. According to one implementation, the energy required by the blower 150 can be measured. The data of the blower energy can indicate whether there is blockage of the touch surface, which in turns indicates that the touch surface is occupied. According to another implementations, for a given position of the flow control valve 140, blower 150 speed, and/or TED 120 power, there is an expected delta-T between the temperature of the TED 120 (e.g., main side 122, as measured by NTC 171) and a temperature of ambient cabin air. By comparing this expected delta-T with a measured or calculated delta-T of the ambient cabin air and the temperature of the TED 120, the occupied state of the seat 200 can be determined. If the delta-T is out of the expected range for an occupied or unoccupied seat at current conditions, this information can indicate that the seat is actually unoccupied or occupied. Accordingly, the system 100 itself can be used to determine an occupancy state of the seat 200. According to another technique, determining whether the seat 200 or other surface is occupied is based on a signal received from a vehicle occupant detection system including image/video based systems, driver monitoring system, or occupant monitoring system.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of climate control systems and control algorithms have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of climate control systems and related methods have been disclosed. This disclosure extends beyond the specifically disclosed examples to other alternative examples and/or other uses of the examples, as well as to certain modifications and equivalents thereof.

Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A control method for conditioning a surface with a thermal conditioning system having a thermoelectric device (TED), comprising:
   determining whether the surface is occupied;
   providing power to the TED, the TED including a main side and a waste side;
   providing an airflow with a blower; and
   adjusting a position of a flow control valve to adjust a proportion of the airflow between a main side flow path across the main side of the TED and a waste side flow path across the waste side of the TED based on whether the surface is occupied,
   wherein the flow control valve is in a first position that directs a majority of the airflow along the waste side flow path with the surface determined to be unoccupied, and
   wherein the flow control valve is in a second position with the surface determined to be occupied.

2. The control method of claim 1, wherein determining whether the surface is occupied is based on a signal received from a force sensor in a vehicle seat.

3. The control method of claim 1, wherein determining whether the surface is occupied is based on whether a vehicle is remotely started.

4. The control method of claim 1, wherein the control method is a startup mode.

5. The control method of claim 1, wherein determining whether the surface is occupied is based on comparing a delta-T between a temperature of the TED and a temperature of ambient cabin air with an expected delta-T between the temperature of the TED and the temperature of ambient cabin air based at least on the position of the flow control valve.

6. The control method of claim 1, wherein the thermal conditioning system is operated in a heater mode.

7. The control method of claim 1, wherein the thermal conditioning system is operated in a cooling mode.

8. The control method of claim 1, wherein the power provided to the TED is based on whether the surface is occupied.

9. The control method of claim 8, wherein the power provided to the TED is based on the surface being determined to be unoccupied.

10. The control method of claim 9, wherein the power provided to the TED is 100%.

11. The control method of claim 1, wherein the first position of the flow control valve directs the airflow between the main side flow path and the waste side flow path at a ratio between 1:99 and 30:70.

12. The control method of claim 1, further comprising adjusting the flow control valve to the second position based on detecting a set temperature of the airflow.

13. The control method of claim 12, wherein the second position of the flow control valve directs more airflow along the main side flow path than in the first position.

14. The control method of claim 12, wherein the second position of the flow control valve directs the airflow between the main side flow path and the waste side flow path at a ratio between 30:70 and 95:5.

15. The control method of claim 12, further comprising regulating the power provided to the TED based on detecting the set temperature of the airflow.

16. The control method of claim 15, wherein the power provided to the TED is reduced based on detecting the set temperature.

17. The control method of claim 12, further comprising adjusting the flow control valve to a third position based on an in-cabin air temperature.

18. The control method of claim 17, wherein the third position closes the waste side flow path.

19. The control method of claim 17, wherein the in-cabin air temperature is based on a signal from an NTC.

20. The control method of claim 17, wherein the power provided to the TED is reduced based on the in-cabin air temperature.

21. The control method of claim 20, wherein the power provided to the TED is shut off.

22. The control method of claim 12, further comprising increasing a speed of the blower to increase a speed of the airflow.

23. The control method of claim 1, further comprising adjusting the flow control valve to the second position based on determining that the surface has changed from unoccupied to occupied.

24. The control method of claim 23, wherein the second position of the flow control valve directs more airflow along the main side flow path than in the first position.

25. The control method of claim 23, further comprising adjusting the flow control valve to a third position based on an in-cabin air temperature.

26. The control method of claim 1, wherein determining whether the surface is occupied is based on a signal received from a vehicle occupant detection system.

27. A control method for conditioning a surface with a thermal conditioning system having a thermoelectric device (TED), comprising:
   determining that the surface is unoccupied;
   providing power to the TED, based at least in part on the determination that the surface is unoccupied, wherein the TED includes a main side and a waste side; and
   providing power to a blower to direct airflow through the TED based at least in part on the determination that the surface is unoccupied, with power being provided to the TED.

28. The control method of claim 27, further comprising:
   determining that the surface has changed from unoccupied to occupied; and
   adjusting a proportion of the airflow between a main side flow path across the main side of the TED and a waste side flow path across the waste side of the TED based on the determination that the surface is occupied.

29. The control method of claim 28, wherein adjusting the proportion of the airflow between the main side flow path and the waste side flow path includes adjusting a position of a flow control valve from a first position to a second position.

30. The control method of claim 29, wherein a greater volume of air is directed along the main side flow path in the second position than in the first position.

* * * * *